United States Patent [19]
Tench et al.

[11] Patent Number: 5,461,907
[45] Date of Patent: Oct. 31, 1995

[54] IMAGING, CUTTING, AND COLLECTING INSTRUMENT AND METHOD

[75] Inventors: Robert J. Tench, Tracy; Wigbert J. Siekhaus, Berkeley; Mehdi Balooch, Berkeley; Rodney L. Balhorn, Livermore; Michael J. Allen, Davis, all of Calif.

[73] Assignee: Regents of the University of California, Oakland, Calif.

[21] Appl. No.: 35,741

[22] Filed: Mar. 23, 1993

[51] Int. Cl.⁶ .................................................... H01J 3/14
[52] U.S. Cl. ............................................................. 73/105
[58] Field of Search .................................. 73/105, 82, 85; 250/306, 307; 435/291; 83/100, 102, 919, 929

[56] References Cited

U.S. PATENT DOCUMENTS

| | | |
|---|---|---|
| 4,800,274 | 1/1989 | Hansma et al. . |
| 4,806,755 | 2/1989 | Duerig et al. . |
| 4,943,719 | 7/1990 | Akamine et al. ................ 250/306 |
| 5,021,364 | 6/1991 | Akamine et al. ................ 250/306 |
| 5,047,633 | 9/1991 | Finlan et al. . |
| 5,254,854 | 10/1993 | Betzig . |
| 5,338,932 | 8/1994 | Theodore et al. ............... 250/307 |

*Primary Examiner*—Raevis
*Attorney, Agent, or Firm*—Henry P. Sartorio; L. E. Carnahan

[57] ABSTRACT

Instrumentation and techniques to image small objects, such as but not limited to individual human chromosomes, with nanometer resolution, to cut-off identified parts of such objects, to move around and manipulate such cut-off parts on the substrate on which they are being imaged to predetermined locations on the substrate, and to remove the cut-off parts from the substrate. This is accomplished using an atomic force microscope (AFM) and by modification of the conventional cantilever stylus assembly of an AFM, such that plural cantilevers are used with either sharp-tips or knife-edges thereon. In addition, the invention can be utilized for measuring hardness of materials.

24 Claims, 4 Drawing Sheets

IMAGING, CUTTING, AND COLLECTING INSTRUMENT AND METHOD

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to processing biological molecules, particularly to imaging biological molecules with an atomic force microscope (AFM), and more particularly to a method and apparatus for imaging, cutting, and collecting biological molecules with nanometer resolution, and measuring hardness of materials.

An atomic force microscope (AFM) scans over the surface of a sample in two different modes of operation. In one mode, known as the contacting mode, a sharp tip is mounted on the end of a cantilever and the tip rides on the surface of a sample with an extremely light tracking force, on the order of $10^{-5}$ to $10^{-10}$ Newtons (N). In the contacting mode of operation, profiles of the surface topology are obtained with extremely high resolutions. Images showing the position of individual atoms are routinely obtained. In the other mode, the tip is held a short distance, on the order of 5 to 500 Angstroms, from the surface of a sample and is deflected by various forces between the sample and the tip, such forces include electro-static, magnetic, and van der Waals forces.

Several methods of detecting the deflection of the cantilever are available which have sub-angstrom sensitivity, including vacuum tunneling, optical interferometry, optical beam deflection, and capacitive techniques. However, fabrication of a readily reproducible cantilever stylus assembly has been a limiting factor on use of AFM and other forms of microscopy, such as scanning tunneling microscopes.

A typical cantilever stylus assembly includes a cantilever arm and a protruding tip on the arm, and in certain applications it is desirable that the cantilever flex in only one direction and have high lateral stiffness. Also, it is often required that a conductive electrode be located on the cantilever opposite the tip. In addition, the protruding tip must be sharp, that is with a radius less than 500 Angstroms and which may terminate in a single atom to provide good lateral resolution.

Substantial effort has gone into developing cantilevers and the formation of tips of various types and configurations. The cantilever arms have been made of fine tungsten wires with tips such as tiny diamond fragments, or other appropriate composition, secured thereon. Also, cantilevers have been fabricated using photo lithographic techniques, but such techniques did not produce satisfactory tips. Etching of silicon wafers has been used to produce the cantilevers, and more recently processes used in the silicon semiconductor integrated circuit industry have been used. These latter prior art cantilever fabrication processes are exemplified by U.S. Pat. Nos. 4,943,719 dated Jul. 24, 1990 and No. 5,021,364 dated Jun. 4, 1991, each issued to S. Akamine et al.

While these prior fabrication techniques and AFM apparatus have been successfully employed to image biological molecules with nanometer resolution, and micro-manipulators have been designed to isolate and hold single cells, but these prior approaches do not have the capability to cut and to move parts of biological molecules to predetermined locations. Flow sorting can be used to isolate cells and chromosomes tagged with fluorochromes and to direct them onto slides or into test tubes, but it cannot discriminate between and isolate structures containing subtle morphological differences. Thus, there is a need for a technique and apparatus to image small objects (such as human chromosomes, with nanometer resolution and to dissect cells or chromosomes and to isolate and collect nanometer-size fragments or organelles.

The present invention satisfies this need by providing instrumentation and techniques to image such small objects, to cut off identified parts of such objects, and to move or manipulate such cut-off parts on a substrate on which they are being imaged to predetermined locations on the substrate for collecting the desired cut-off parts. Also, the invention provides a capability for measuring hardness of small objects.

SUMMARY OF THE INVENTION

It is an object of the present invention to provide a method for imaging, cutting, and collecting small objects, such as individual human chromosomes.

It is a further object of the invention to provide a means for measuring hardness of materials comprising small objects.

A further object of the invention is to provide a means for identifying small objects with nanometer resolution, cut-off identified parts of such objects, and to manipulate such cut-off parts to a point of collection.

Another object of the invention is to provide a cantilever arm of an atomic force microscope with an atomically sharp knife-edge for cutting small objects, such as human chromosomes.

A still further object of the invention is to provide an atomic force microscope with a plurality of cantilevers using the conventional pyramidal or pointed tip and/or the knife-edge tip, to facilitate cutting and collecting operations.

Other objects and advantages of the present invention will become apparent from the following description and accompanying drawings.

The present invention basically comprises a method and means for imaging, cutting, and manipulating for collection of molecules, chromosomes, and other small objects, and/or measuring the hardness of such objects, using an atomic force microscope (AFM). In the invention, the molecule may be scanned by a conventional AFM micro tip, a knife-edged micro tip made in accordance with this invention, or the conventional micro tip in combination with one or more knife-edged micro tip. When scanning is done with the knife-edged micro tip it is necessary to rotate the sample to obtain a full scan. The knife-edged micro tip is used to cut and/or manipulate, for example, a molecule or molecular fragments for collecting same. Additionally, the substrate bed upon which the molecule rests may be prepared with small holes into which desired molecules or fragments may be maneuvered and trapped. Thus, the desired molecular fragments may be cut, sorted and eventually collected. For measuring the hardness of such small objects, they are indented by a cantilever tip and the indentation measured. Various embodiments of conventional and knife-edged micro tip combinations are provided to accomplish the method of imaging, cutting, and collecting in accordance with this invention.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
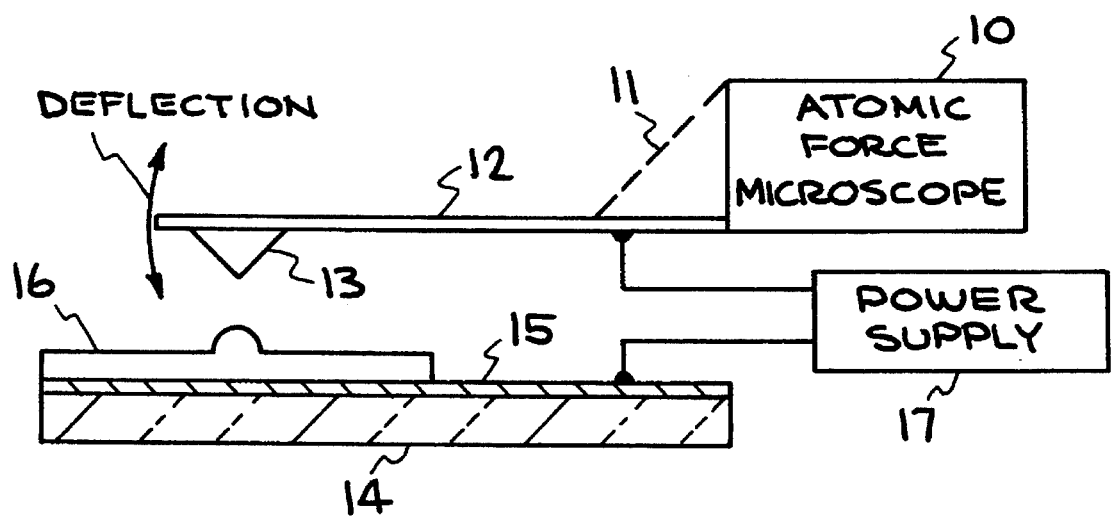
FIG. 1 is a schematic illustration of a deflectable cantilever of an atomic force microscope (AFM) having voltage pulses applied thereto.

The present invention is directed to an imaging, cutting, and collecting means and method using an atomic force microscope (AFM), which also provides the capability of measuring hardness of small objects. As pointed out above, techniques are not previously available today for physically manipulating or dissecting cells or other structures with nanometer accuracy and to collect them in a controlled manner, even though micro manipulators have been designed to isolate and hold single cells. Also, as pointed out above, atomic force microscopes have been employed to image biological molecules with nanometer resolution, but not to cut and to move parts of biological molecules purposefully to predetermined locations.

The invention comprises instrumentation and techniques to image small objects (such as individual human chromosomes) with nanometer resolution, to cut off identified parts of such objects, and to move around and manipulate such cut-off parts on the substrate on which they are being imaged to predetermined locations on the substrate for collection thereof, via holes in the substrate. The invention utilizes an electrically conductive substrate, or a non-conductive substrate with a film or layer of conductive material, to which biological molecules sticks, and which is fabricated in such a way that there is at least one hole per scan area leading out of the imaging/cutting part of the instrument to the outside, the hole being of a size suitable to extract in a controlled manner, such as by a suction tube, the cut fragments for subsequent analysis. The invention further utilizes electrostatic or electromagnetic means to move up and down or to change the force-constant of the cantilever(s) used in atomic-force imaging and/or cutting, so that imaging can be performed with minimum force and cutting with the maximum desired force. The invention involves very high speed scanning used along a line for cutting with the conventional atomically sharp tip or an alternate means of cutting is used, i.ei . . . to change the imaging device from an atomically sharp tip to an atomically sharp knife-edge. When using the knife-edge cutting technique, resolution is lost in one direction (parallel to the knife-edge) only, and to make the width of the knife-edge suitable to the combined imaging/cutting task, means are provided to rotate the target around the center of scan of the instrument such that any object can be imaged with nanometer resolution in one direction. After imaging and identifying a line of cut, the knife-edge is brought to the line of cut, and moved up and down by electrostatic or electromagnetic means to execute the cut while the target is either stationary or being moved slowly parallel to the knife-edge. The invention additionally involves a new cantilever design in which two independent cantilevers, one carrying an atomically sharp tip for imaging, the other an atomically sharp knife-edge for imaging/cutting, are combined into a single device, but having independent electrostatic or electromagnetic means to move them up or down or to change their force-constant. Also, an independent, three cantilever arrangement is provided using two knife-edge cantilevers with the direction of the knife-edges at a 180° difference, and with the third cantilever using a conventional sharp tip located intermediate the knife-edge cantilevers, with each being independently controlled as to direction of motion and force-constant. By these cantilever arrangements a single instrument has the capability to image, cut-off sections, and manipulate the cut-off sections, and to move them to predetermined locations on the substrate, as for instance to holes in the substrate leading to the outside of the instrument through which they may be transported for collection by means such as suction.

The instrument incorporating this invention may also be used for the measurement of local material properties, indenting the material with a cantilever to which a known force has been applied by electro-static or electro-magnetic means, and imaging the indentation in the same instrument with the same or with a differentially shaped tip.

The tip arrangement of this invention, be it single or plural tip, when mounted on the conventional triangular cantilever(s) of an AFM, can be made to exert considerable force (up to $10^{-7}$ newtons) on objects being imaged. This force may be variably applied to image or to slice through an object adsorbed onto a suitable substrate (such as a chromosome absorbed on $SiO_2$), if the tip is continuously restored back and forth at a high scan speed along a single scan line as it passes over the surface of the object.

The present invention provides electronics and electromagnetic modifications to existing AFM devices to make the tip move up and down in a cutting motion with a force of up to $10^{-5}$ newtons while it is slowly scanned along a predetermined line by: 1) applying selected electrically conductive material on the substrate and the cantilever, or 2) using a magnetizable material and a small electro-magnetic coil, with the deflection of the cantilever(s) being detected via a laser beam arrangement. These electrostatic and electromagnetic modification merely involve the application of known technology to controlling the movement of and force on the cantilever(s).

Referring now to the drawings, FIG. 1 illustrates an AFM indicated at 10 operatively connected as indicated by dashed lines 11 to a cantilever 12 incorporating electrically conductive material and having a sharp tip 13 thereon. A substrate 14 having a conductive layer 15 has a sample 16 absorbed thereon, and is connected electrically via a power supply or source 17 to cantilever 12, with the power source 17 being within AC or DC. For example, an AC voltage, from power source 17, applied to cantilever 12 either during a scan or stationary will reveal in the amount of deflection of the cantilever 12 the local mechanical properties of the substrate (14–15) or any absorbed (sample 16) on the substrate. By varying the applied voltage the force can be adjusted such that a measurable deflection, indicated by legend, occurs, this cantilever deflection being measured by known laser light detection techniques, such as practiced commonly by atomic force microscopes used commercially.

Figure 2A:
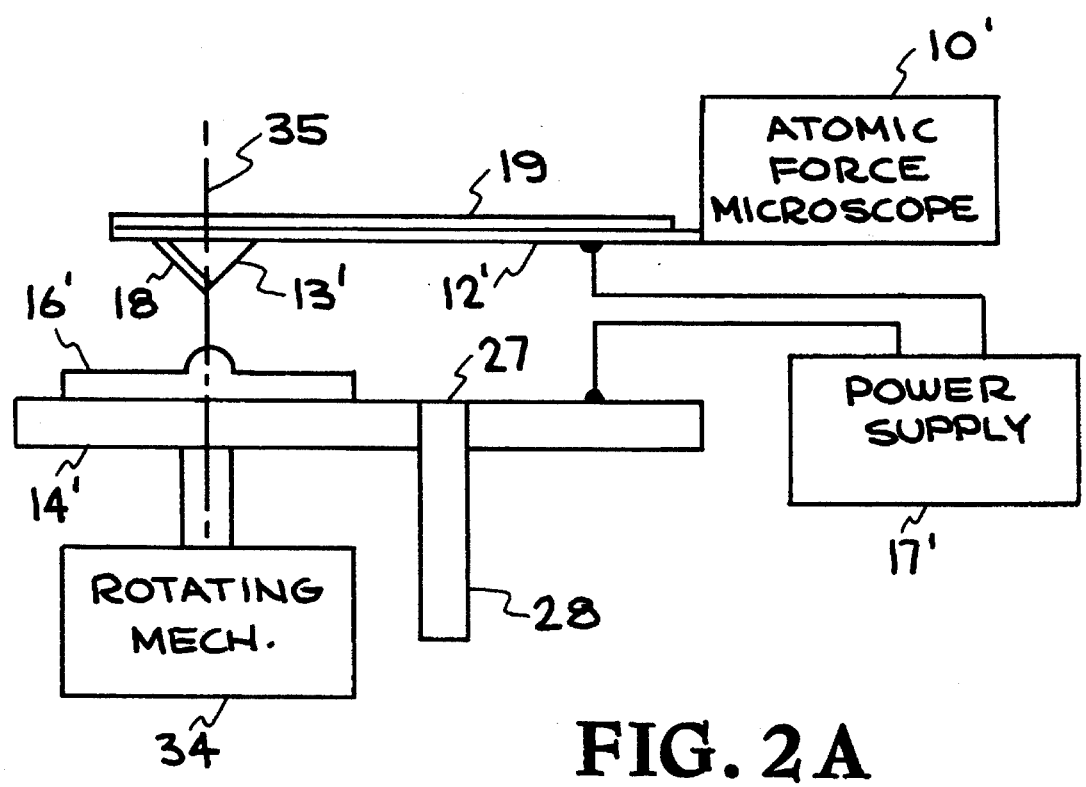
FIGS. 2A–2C is a schematic illustration of the invention showing forces applied by either electrostatic or electromagnetic means to manipulate a cantilever on a substrate in accordance with the present invention.
Figure 2B:
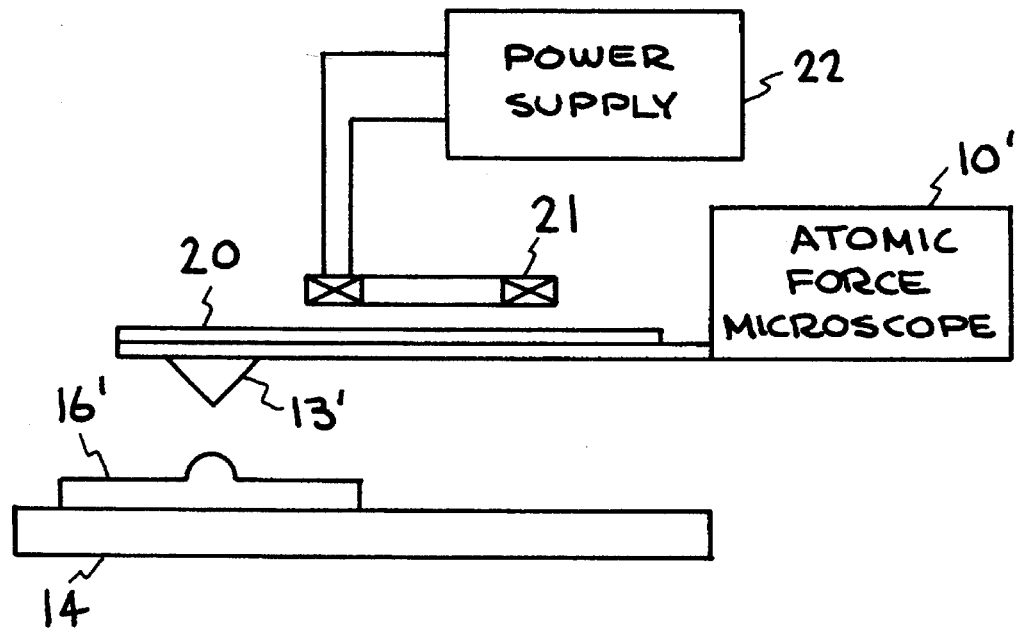
Figure 2C:
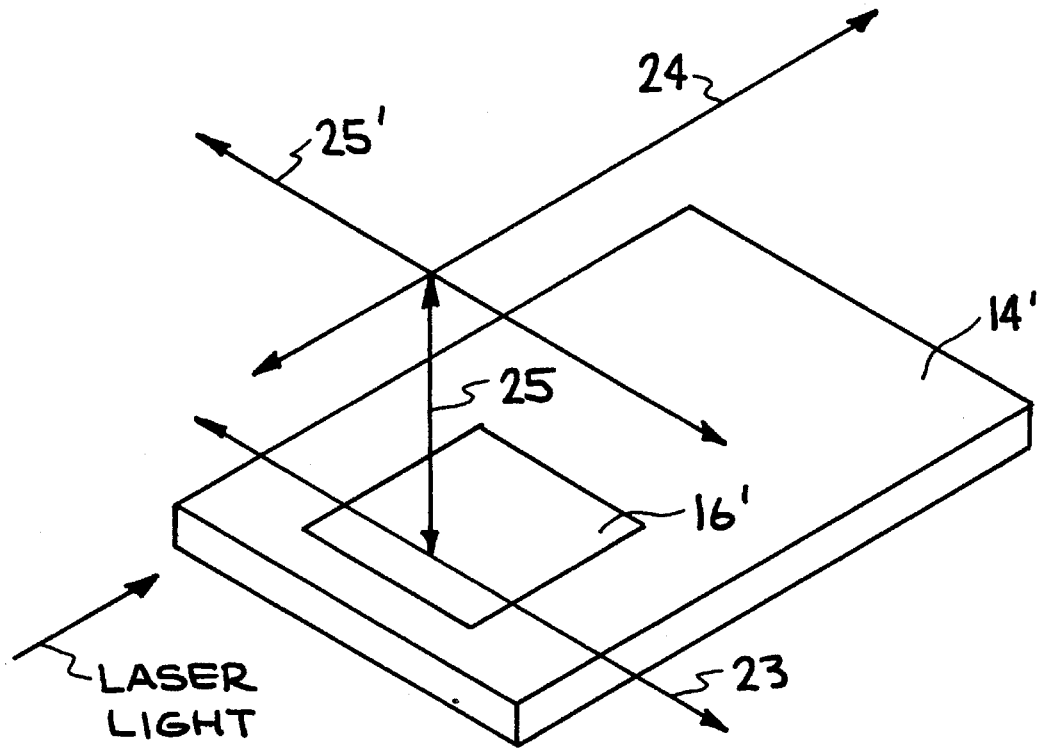

FIGS. 2A–2C schematically illustrates both the electronic (electrostatic) and electro-magnetic modifications to provide the cantilever movement and force-constant arrangement of the present invention, and components are given reference numbers similar to those of the FIG. 1 device. FIG. 2A illustrates basically a cantilever 12' operatively connected to an AFM 10' is positioned over a substrate 14' having a sample 16' thereon to be imaged/cut. In the electrostatic (electronic) approach, a power supply 17' is electrically connected to substrate 14' and cantilever 12' such that the tip 13' is moved up and down in a cutting motion at a desired rate of defections per second, and with a force of up to $10^{-5}$ newtons while it is slowly scanned along a predetermined line. The rate of deflection and the rate of scanning are chosen such that a continuous cut occurs. The cantilever 12' is forced down by applying a voltage between a coating or conductor 18, such as gold on tip 13' of the cantilever 12' and the substrate 14' made of silicon, and is forced up by applying a voltage between the cantilever and a conductor or conductive layer 19, of gold for example on top of the cantilever. The magnitude of the force can be varied by the voltage applied and by varying the size of the cantilevers coated tip area 18. Alternatively in the electro-magnetic approach, as shown in FIG. 2B, the top of cantilever 12' is coated with a magnetizable material 20, and a small electromagnetic coil 21 connected to a power supply 22 is used to exert upward or downward force on the cantilever 12'. The advantage of using magnetic force-generation is that no electric field is applied across the object to be imaged/cut. As seen in FIG. 2C, a predetermined line of cut across sample 16' is indicated at 23, and the force-constant line indicated at 24 with the deflection forces being indicated by arrows 25 and 25'. While not illustrated, in the electrical (electronic) approach the voltage from power supply 17' is switched as described above by conventional electrical (electronic) switching circuitry to produce the deflection (up and down motion) of tip 13' of cantilever 12'; and in the electromagnetic approach, current to the magnetic coil 21 is interrupted at a desired rate to produce the desired deflection rate of cantilever 12', and the circuitry therefore is conventional in the art. Laser light from a source not shown is utilized to detect cantilever deflection, as indicated by the legend and arrow in FIG. 2C.

After cutting, as above described, the AFM 10' is programmed to manipulate or "shove" a cut section of sample 16' into a hole 27 in substrate 14', from where it will be moved into a vial located outside the instrument by suction tube 28. The substrate 14' may, for example, be an oxidized silicon chip etched to have one hole per 130 μm square.

The mode of cutting described above may fail in some applications. For instance, the single continuous tightly wound DNA fiber which makes up a chromosome may be pushed out of the way rather than be cut by the conventional cantilever pyramidal AFM tips. To solve this problem, the cantilever tip has been modified such that the outer end thereof is in a knife-edge configuration rather than in a point configuration.

Figure 3A:
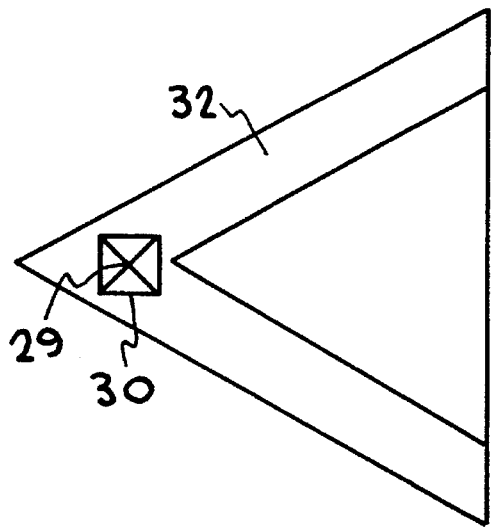
FIGS. 3A and 3B are top and side view of a cantilever micro tip used in an atomic force microscope (AFM).
Figure 3B:
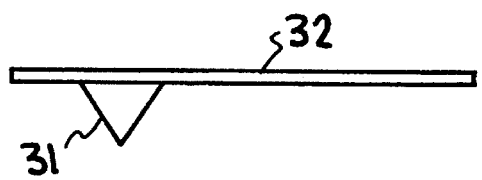
Figure 4A:
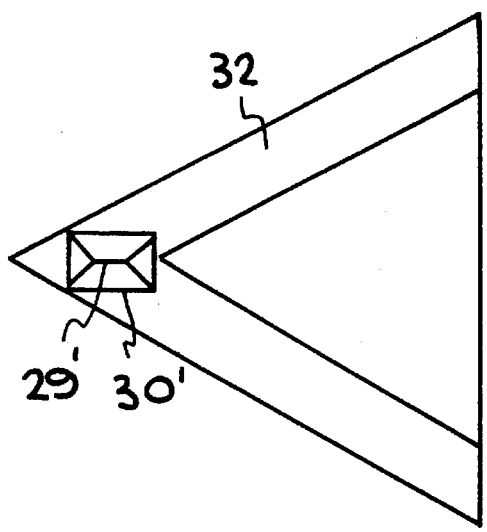
FIGS. 4A and 4B are top and side views of a knife-edged cantilever micro tip for an AFM in accordance with the invention.
Figure 4B:
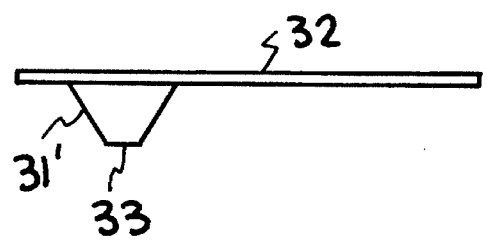
Figure 6:
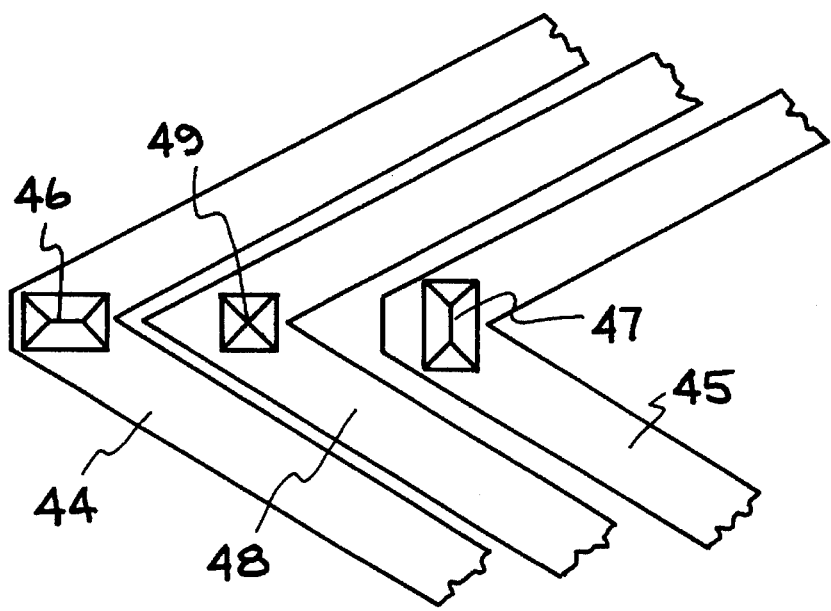
FIG. 6 is a top view of an embodiment of an imaging/cutting/manipulating cantilever micro tip combination for an AMF.

AFM tips are presently fabricated by etching silicon through a square hole 29 in a mask 30, nitriding the silicon surface through a cantilever pattern, and etching away the silicon substrate to produce a tip 31 on cantilever 32, see FIGS. 3A and 3B. By changing the square hole 29 in mask 30 of FIG. 3A into a rectangle 29' of mask 30', a tip 31' which ends in a knife-edge 33 rather than a point is produced, see FIGS. 4A and 4B. The orientation of the knife-edge 33 can be chosen at will, and as seen in FIG. 6 may be oriented so as to be in alignment with the tip end of cantilever 32 or oriented so as to be perpendicular to the tip end of the cantilever. The length of the knife-edge 33 of tip 31' of FIG. 4B are preferred to be shorter than or of the same length as the width of the object to be cut (such as a chromosome's arm).

AFM-imaging with a knife-edge tip is still possible, but will lead to images whose resolution in one direction is limited to the width of the knife-edge. However, by rotating the substrate 14' (FIG. 2A) by mechanism generally indicated at 34 around the scan axis indicated by dash line 35, imaging in the direction important for determining the cut can still be accomplished with nanometer resolution. After imaging with a knife-edge tip via rotation of the substrate, cutting and collecting (manipulating into hole 27 of FIG. 2A) is carried out by the AFM using the knife-edge tip, with suitable force applied, to "shove" the cut part to a preprogrammed location, such as a hole in the substrate. Also, the substrate can be moved to facilitate movement of the cut-off part to the location of interest.

Figure 5:
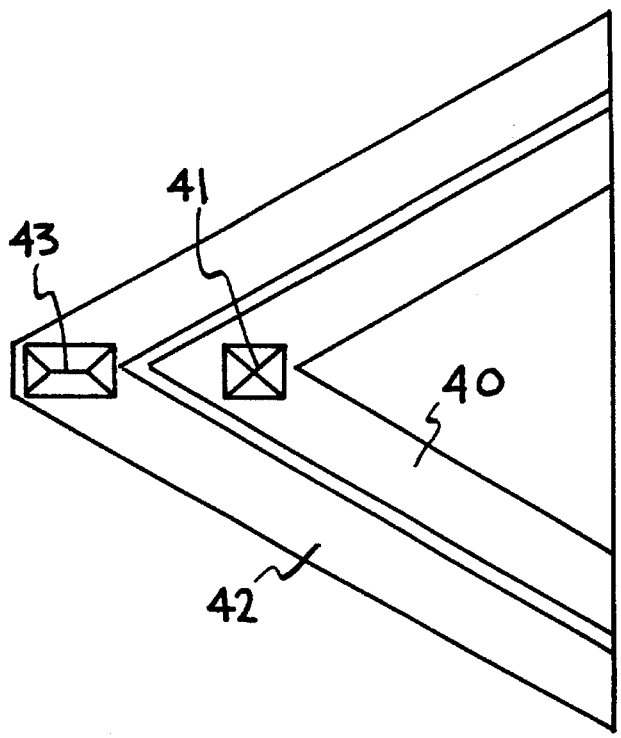
FIG. 5 is a top view of an embodiment of an imaging/cutting cantilever micro tip combination for an AMF.

A more universally applicable imaging, cutting and manipulating instrument is provided by this invention in which two or more cantilevers are utilized, each cantilever having a different tip configuration. As illustrated in FIG. 5 a cantilever 40 with a conventional tip 41 is located within a cantilever 42 with a knife-edge tip 43. Each of cantilevers 40 and 42 are operatively connected to the AFM and individually deflected by electronic and/or electromagnetic means as described above with respect to FIG. 2, such that, for example, cantilever 40 is utilized for imaging and cantilever 42 is utilized for cutting, and collecting (manipulating) the cut-off part of the sample or object.

FIG. 6 illustrates a further refinement having two cantilevers 44 and 45 having knife-edge tips 46 and 47, respectively, with a cantilever 48 having a point tip 49 positioned between cantilevers 44 and 45. Note that knife-edge tip 46 is oriented at a right angle with respect to knife-edge tip 47 to facilitate cutting or "shoving" operations. Thus, pointed tip 49 may be used for imaging and knife-edge tips 46 and/or 47 may be used for cutting and manipulating the cut-off part. The distance between the cutting knife-edge tip(s), and the imaging point tip (of the FIGS. 5 and 6 embodiments) is fixed and can be measured with high precision. The instrument using the cantilever arrangement of either FIG. 5 or FIG. 6 is designed such that it has independent electrostatic or electromagnetic means so that all or any one of the cantilevers can be independently lifted up and down electrostatically or electro-magnetically, (certain of the cantilevers may be moved electrostatically while other are moved electro-magnetically). Thus, the imaging and the cutting or "shoving" operations can be performed without interfering with each other.

The object to be analyzed is placed onto a suitable substrate, such as an oxidized silicon surface, into which holes have been etched with a size such that the expected cut can be extracted there through and with a hole density of up to one hole per scan area of the AFM (for example, 130 μm square maximums). In this way all cut sections lying within the scan range of the AFM head can be analyzed and cut into pieces to be collected to the outside. Each hole is connected independently to the outside of the instrument, or all holes are connected together to the outside via a suction tube arrangement. The imaging, cutting, and manipulating ("shoving") processes described above are designed to operate in vacuum, air and other fluids.

The present invention has specific application to biological implementation, but not limited thereto. The capability provides by this invention for the dissection of micron-sized biological studies with nanometer resolution will impact a wide variety of biological studies. Examples of future applications include, but are not limited to the preparation of sub-chromosomal DNA libraries, the physical dissection of single cosmic DNA's, the isolation of individual mutant cells for genetic analysis, the micro-dissection of biological structures (such as sperm chromatin) for subsequent structural and biochemical analysis, and the construction of chromosome fragments for studying the genetic effects of specific chromosomal deletions in living cells.

The following is an example imaging, cutting, and selecting cuts (collecting) from chromosomes, utilizing the method and instrumentation of the present invention. The largest human chromosome, chromosome 1, obtained from colcemid-blocked human lymphocytes, purified by flow sorting, was deposited directly onto an oxidized silicon substrate having etched holes, for imaging in air with the AFM. Similar samples have been prepared for imaging the fully hydrated chromosomes in saline in the fluid cell. Short colcemid treatments will be used to produce maximally extended chromosomes, and the structure of the chromosomes will be stabilized by including magnesium or polyamines in the buffers. Imaging has been performed at increasing levels of force to determine how tightly the chromosomes are attached to the surface. The images obtained are used to determine if there are natural structural features (like banding patterns) that dictate where the sites of cutting should be directed. If the chromosomes do not stick tightly enough to a surface, such as oxidized silicon, to permit imaging, the surface may be coated with polylysine and the chromosomes will be attached and imaged with or without cross linking to the polylysine via DMS. After imagings and identifying (which include harness measurement), with any of the cantilevers described above, a particular line of cut, cutting will be performed in the manner described above, the cut ends manipulated to a collection hole, and sectioned to a container outside the imaging area.

The present invention has been successfully implemented using electrostatic deflection of the AFM's cantilever by applying voltages, from 22.5 to 300 volts, between a conductive substrate and a conductive coating deposited on the top or the bottom commercially available AFM cantilevers. This invention has been implemented in the AFM itself, using both: 1) a cantilever mounted in an insulated glass holder, which allows the substrate to be imaged to be a ground potential while a voltage is applied to the coating on the cantilever to induce a force, and 2) a cantilever mounted in a conducting holder, in which case the cantilever's coating is held at ground potential while a voltage is applied to the conducting substrate onto which a specimen of interest is absorbed.

In the AFM, this invention allows an application of force (up to $10^{-4}$ Newton for the voltages and shapes used thus far) in the following ways:

1) After imaging an area of interest with the usual atomic force pointed tip (FIGS. 3A & 3B) using the nucleus of a bull-sperm head as the biological specimen, the AFM's tip was positioned with nanometer precision to a spot of interest. Applying then, while the tip sits at that spot, a given voltage, makes the tip slam down with known acceleration onto that spot, creating a nano-indentation determined by the tip's shape. That indentation is measured and the hardness of the material is determined by known techniques.

2) After imaging an area of interest with the usual atomic force pointed tip, using again a nucleus of a bull-sperm head, the AFM's tip was positioned to a spot of interest, application of a voltage makes the tip come down with a known force, and then by scanning the tip back and forth while this known force was applied along a line, the angle of which can be chosen at will, a cut was made. A number of such cuts were made at different force-levels, angles and number of back and forth scans.

The force-level has been controlled over a very wide range, and has been found to be sufficient to either indent and slice biological materials. Thus, it has been experimentally verified that the force exerted by the AFM cantilever can be varied electro-statically, and as the result the AFM can be used to indent or slice materials over a wide range hardness.

The invention, as illustrated in the drawings and described above, provides the following features:

1. An AFM that images an object, with a cantilever, and if desired identifies hardness of the object, at normal force constant, scan area of 130 µm square, and can identify many objects.

2. A particular scan-line is identified as a "line of cut", and AFM electronics allows any orientation to be defined as the "scan line".

3. AFM electronics is set to scan along a "line of cut".

4. In the cutting region a sinusoidal potential is applied between a gold coating on top of the cantilever and the silicon substrate (or to the electro-magnetic coil) forcing the AFM-tip up and down in a cutting motion as it scans along.

5. A cut segment is "shoved" by the AFM-tip towards a hole and is sucked into a reservoir.

6. Operations 1–5 above is repeated with any object in selected scan area.

7. New scan area with new section hole is identified and above procedures 1–6 repeated.

It has thus been shown that the present invention provides a method and instrumentation for imaging, cutting, and collecting small objects, such as individual human chromosomes, with nanometer resolution. Also, the invention enables hardness measurements of such objects. This is accomplished using an AFM with a modified cantilever and/or cantilever tip arrangement, and which may be deflected by either electrostatic or electro-magnetic means to produce imaging, cutting, and collecting operations.

While particular embodiments of the invention have been illustrated and described, and specific materials and parameters have been described, such is not intended to limit the invention. Modifications and changes will become apparent to those skilled in the art. The scope of this invention is intended to include all such modifications and change, and is intended to be limited only by the scope of the appended claims.

We claim:

1. In an atomic force microscope, the improvement comprising:

means for imaging, cutting, and collecting small objects including human chromosomes, said means including a cantilever arrangement having at least one cantilever with a knife-edge configured cutting tip thereon.

2. The improvement of claim 1, additionally including electrostatic means for deflecting said cantilever in an up and down motion and for applying a force thereto.

3. The improvement of claim 1, additionally including electromagnetic means for deflecting said cantilever in an up and down motion and for applying force thereon.

4. The improvement of claim 1, wherein said cantilever arrangement additional includes a cantilever having a pointed imaging tip thereon.

5. The improvement of claim 1, wherein said cantilever arrangement additionally includes at least one cantilever having a pointed imaging tip thereon, and at least one additional cantilever having a knife-edge configured cutting tip thereon.

6. The improvement of claim 5, wherein said cantilever having a pointed tip is located intermediate said cantilevers having knife-edge configured cutting tips thereon.

7. The improvement of claim 6, wherein said knife-edge configured cutting tips extend in a direction perpendicular to each other.

8. The improvement of claim 5, wherein each of said knife-edge configured cutting tips extend in a different direction.

9. The improvement of claim 5, additionally including electrostatic means for deflecting at least one of said cantilevers in an up and down motion and for applying a force thereon.

10. The improvement of claim 5, additionally including electromagnetic means for deflecting at least one of said cantilevers in an up and down motion and for applying a force thereon.

11. The improvement of claim 5, additionally including electrostatic means and electro-magnetic means for deflecting said cantilevers in an up and down motion and for applying a force thereon.

12. An improved instrumentation for an atomic force microscope to provide identification, imaging, cutting, and moving cut-off parts of small objects including biological specimens, said improved instrumentation including:

a cantilever assembly constructed to image, cut, and move cut-off parts, said cantilever assembly having at least one cantilever having a tip thereon; and means for deflecting said cantilever in an up and down motion and for applying a force thereon, said means being selected from the group consisting of electrostatic means and electro-magnetic means.

13. The improved instrumentation of claim 12, wherein said tip is configured to have a knife-edge end.

14. The improved instrumentation of claim 12, wherein said cantilever assembly includes another cantilever having a tip thereon, and wherein the tip on said one cantilever is pointed, and said tip on said another cantilever has a knife-edge end thereon.

15. The improved instrumentation of claim 12, wherein said cantilever assembly includes at least three cantilevers, each having a tip thereon, and wherein said tip of said one cantilever has a pointed end, and said tips of two of said three cantilevers have a knife-edge ends, and wherein said one cantilever is located intermediate the other two cantilevers.

16. The improved instrumentation of claim 15, wherein said knife-edge tip of one of said two cantilevers having knife-edge tips is perpendicular to said knife-edge tip of the other of said two cantilevers.

17. A method for imaging, cutting, and collecting small objects, including biological specimens, including the steps of:

forming at least one hole in a substrate of selected material;

securing a specimen to be analyzed to the substrate;

positioning a tip of a cantilever of selected material of an atomic force microscope over the specimen;

scanning at least a portion of the specimen by moving the tip over the specimen;

detecting movement of the tip as it moves over the specimen;

determining a line-of-cut on the specimen;

applying a selected force to the cantilever;

directing the tip along the line-of-cut;

applying a force to the cantilever;

moving the tip up and down as it moves along the line-of-cut, resulting in cutting the specimen;

manipulating the cantilever such that the tip contacts a cut-off segment of the specimen;

manipulating the cut-off segment of the specimen into the hole in the substrate; and removing the cut-off segment through the hole in the substrate.

18. The method of claim 17, additionally including the steps of forcing the tip against the specimen causing an indentation thereon, and measuring the indentation for determining hardness of specimen.

19. The method of claim 17, wherein the steps of applying a force to the cantilever and moving the tip up and down are carried out by supplying an interruptable force to the cantilever by means selected from the group of electrostatic and electro-magnetic.

20. The method of claim 17, additionally including the step of forming the tip so as to include a knife-edge end section.

21. The method of claim 17, additionally including the steps of providing the atomic force microscope with a plurality of cantilevers, providing at least one of said cantilevers with a tip having a pointed end, and providing certain of said cantilevers with a tip having a knife-edge end.

22. The method of claim 17, additionally including the steps of forming the substrate to include at least a portion thereof having electrically conductive material, providing the cantilever with an electrically conductive coating on at least a portion thereof, and applying an interruptable voltage between the substrate and the coating for producing the force on the cantilever and for moving the tip up and down.

23. The method of claim 17, additionally including the steps of providing the cantilever with an electro-magnetic material, positioning an electro-magnetic coil adjacent the electro-magnetic material on the cantilever, and selectively activating and deactivating the electro-magnetic coil for producing the force on the cantilever and for moving the tip up and down.

24. The method of claim 17, additionally including the step of forming the tip so as to include a knife-edge on the end of the tip.

* * * * *